United States Patent
Wang et al.

(10) Patent No.: US 12,052,425 B2
(45) Date of Patent: Jul. 30, 2024

(54) PREDICTION VALUE DETERMINATION METHOD, ENCODER AND COMPUTER STORAGE MEDIUM

(71) Applicant: GUANGDONG OPPO MOBILE TELECOMMUNICATIONS CORP., LTD., Guangdong (CN)

(72) Inventors: Jun Wang, Guangdong (CN); Heng Zhang, Guangdong (CN); Fan Liang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 282 days.

(21) Appl. No.: 17/471,043

(22) Filed: Sep. 9, 2021

(65) Prior Publication Data
US 2021/0409719 A1 Dec. 30, 2021

Related U.S. Application Data

(63) Continuation of application No. PCT/CN2019/077723, filed on Mar. 11, 2019.

(51) Int. Cl.
*H04N 11/02* (2006.01)
*H04N 19/105* (2014.01)
(Continued)

(52) U.S. Cl.
CPC ......... *H04N 19/137* (2014.11); *H04N 19/105* (2014.11); *H04N 19/176* (2014.11); *H04N 19/182* (2014.11)

(58) Field of Classification Search
CPC .. H04N 19/137; H04N 19/105; H04N 19/176; H04N 19/182
(Continued)

(56) References Cited

U.S. PATENT DOCUMENTS 5,592,207 A * 1/1997 Kobayashi ............... B41J 2/471
347/132
8,917,951 B1 * 12/2014 Chen ..................... G06T 3/4038
382/218
(Continued)

FOREIGN PATENT DOCUMENTS

| CN | 104471935 A | 3/2015 |
| CN | 107071478 A | 8/2017 |

(Continued)

OTHER PUBLICATIONS

International Search Report in the international application No. PCT/CN2019/077723, mailed on Nov. 29, 2019.
(Continued)

*Primary Examiner* — Jayanti K Patel
*Assistant Examiner* — Richard B Carter
(74) *Attorney, Agent, or Firm* — Perkins Coie LLP (57) ABSTRACT

A prediction value determination method, an encoder and a decoder are provided. The method is applicable to an encoder or a decoder, and the method comprises: acquiring reconstructed blocks of a block to be encoded, a number of the reconstructed blocks being more than one; processing template pixel matrices of the reconstructed blocks according to preset processing parameters to obtain processed template pixel matrices; determining a matched block of the block to be encoded according to the processed template pixel matrices; and determining a pixel matrix of the matched block of the block to be encoded as a prediction of the block to be encoded.

12 Claims, 7 Drawing Sheets (51) Int. Cl.
*H04N 19/137* (2014.01)
*H04N 19/176* (2014.01)
*H04N 19/182* (2014.01)

(58) Field of Classification Search
USPC .......................... 375/240.02, E7.2; 382/218
See application file for complete search history.

(56) References Cited

U.S. PATENT DOCUMENTS

| | | | |
|---|---|---|---|
| 9,264,713 | B2 | 2/2016 | Joshi et al. |
| 2012/0163473 | A1* | 6/2012 | Laroche ............... H04N 19/105 |
| | | | 375/E7.2 |
| 2014/0016698 | A1 | 1/2014 | Joshi et al. |
| 2017/0238011 | A1 | 8/2017 | Pettersson et al. |
| 2017/0280144 | A1* | 9/2017 | Dvir ..................... H04N 19/119 |
| 2017/0339404 | A1 | 11/2017 | Panusopone et al. |
| 2018/0241993 | A1 | 8/2018 | Panusopone et al. |
| 2019/0068989 | A1 | 2/2019 | Lee |
| 2019/0230285 | A1 | 7/2019 | Kim |
| 2019/0320169 | A1 | 10/2019 | Panusopone et al. |
| 2020/0137383 | A1 | 4/2020 | Panusopone et al. |
| 2020/0145668 | A1* | 5/2020 | Kotra ................... H04N 19/119 |
| 2020/0204829 | A1* | 6/2020 | Stepin .................... H04N 19/82 |
| 2021/0203925 | A1 | 7/2021 | Panusopone et al. |

FOREIGN PATENT DOCUMENTS

| | | |
|---|---|---|
| CN | 108702509 A | 10/2018 |
| CN | 109076242 A | 12/2018 |
| EP | 3457699 A1 | 3/2019 |
| EP | 3457699 A4 | 8/2019 |
| EP | 3528498 A1 | 8/2019 |
| EP | 3528498 A4 | 8/2019 |
| WO | 2017201141 A1 | 11/2017 |
| WO | 2018066988 A1 | 4/2018 |
| WO | 2018092868 A1 | 5/2018 |

OTHER PUBLICATIONS

Supplementary European Search Report in the European application No. 19918952.3, mailed on Feb. 18, 2022. 9 pages.

Venugopal, G et al "CE8: Intra Region-based Template Matching (Test 8.1) " 12.JVET Meeting; Oct. 3, 2018-Oct. 12, 2018; Macao; (JVET ISO/IEC JTC1/SC29/WG11 and ITU-T SG.16), No. JVET-L0077 Oct. 4, 2018 (Oct. 4, 2018), XP030194617. 9 pages.

Written Opinion of the International Search Authority in the international application No. PCT/CN2019/077723, mailed on Nov. 29, 2019. 7 pages with English translation.

Zhang Z et al:"Non-CE8: Rotate Intra Block Copy" 12. JVET Meeting; Oct. 3, 2018-Oct. 12, 2018; Macao (The Joint Video Exploration Team of ISO/IEC JTC1/SC29/WG11 and ITU-T SG.16), No. JVET-L00411 Sep. 4, 2018 (Sep. 4, 2018), XPO30193561. 7 pages.

First Office Action of the European application No. 19918952.3, issued on May 10, 2024. 5 pages.

* cited by examiner

```
┌─────────────────────────────────────────────────────────┐
│ Calculating differences between pixel values at         │
│ corresponding positions in the template of the block    │─S901
│ to be encoded and the processed templates to obtain     │
│ differences of the processed templates                  │
└─────────────────────────────────────────────────────────┘
                            │
                            ▼
┌─────────────────────────────────────────────────────────┐
│ Determining the matched block of the block to be        │─S902
│ encoded according to the differences of the processed   │
│ templates                                               │
└─────────────────────────────────────────────────────────┘
```

PREDICTION VALUE DETERMINATION METHOD, ENCODER AND COMPUTER STORAGE MEDIUM

CROSS-REFERENCE TO RELATED APPLICATION

This is a continuation application of International Application No. PCT/CN2019/077723 filed on Mar. 11, 2019, the contents of which are hereby incorporated by reference in its entirety.

TECHNICAL FIELD

Embodiments of the present disclosure relate to the technical field of intra prediction in video encoding, and particularly to a method for determining a prediction, an encoder and a computer storage medium.

BACKGROUND

In an existing video coding and decoding standard H265/266, an intra block template-based matching technology is often used for intra prediction. The Joint Video Exploration Team (JEVT)-L0041 proposes a rotation intra block copy technology for intra prediction.

Intra prediction using the intra block template-based matching technology is performed by traversing templates of all reconstructed blocks to search for a minimum value in a square sum of differences between pixel values at corresponding positions in the templates of the reconstructed blocks and a template of a block to be encoded, and determining the pixel value of the reconstructed block corresponding to the template that corresponds to the minimum value as a prediction of the block to be encoded.

In addition, compared with the intra block template-based matching technology, performing intra prediction using the rotation intra block copy technology refers to performing rotation matching on the whole block at any angle to search for a minimum value in a square sum of differences between pixel values of vertexes in the reconstructed blocks and a pixel value of a vertex of the block to be encoded, and determining the pixel value of the reconstructed block corresponding to the minimum value as the prediction of the block to be encoded. When the intra block template-based matching technology is used, the prediction is selected from the templates of the reconstructed blocks that have been encoded and decoded, and thus it is difficult to find the most similar reconstructed block. When the rotation intra block copy technology is used for intra prediction, although the reconstructed blocks are additionally rotated, the calculation amount is increased greatly. It can thus be seen that a prediction determined by intra prediction in existing coding and decoding of a video picture makes the coding and decoding efficiency of the video picture to be relatively low.

SUMMARY

In view of this, the embodiments of the disclosure provide a method for determining a prediction, an encoder, and a computer storage medium, which may improve the coding efficiency of the encoder.

The technical solutions of the embodiments of the disclosure may be implemented as follows.

According to a first aspect, the embodiments of the disclosure provide a method for determining a prediction, which may be applied to an encoder and include the following operations.

Reconstructed blocks of a block to be encoded are acquired, the number of the reconstructed blocks being more than one.

Template pixel matrices of the reconstructed blocks are processed according to preset processing parameters to obtain processed template pixel matrices.

A matched block of the block to be encoded is determined according to a template pixel matrix of the block to be encoded and the processed template pixel matrices.

The pixel matrix of the matched block of the block to be encoded is determined as a prediction of the block to be encoded.

According to a second aspect, the embodiments of the disclosure provide an encoder, which may include an acquisition module, a processing module, a matching module, and a prediction module.

The acquisition module is configured to acquire reconstructed blocks of a block to be encoded, the number of the reconstructed blocks being more than one.

The processing module is configured to process template pixel matrices of the reconstructed blocks according to preset processing parameters to obtain processed template pixel matrices.

The matching module is configured to determine a matched block of the block to be encoded according to a template pixel matrix of the block to be encoded and the processed template pixel matrices.

The prediction module is configured to determine a pixel matrix of the matched block of the block to be encoded as a prediction of the block to be encoded.

According to a third aspect, the embodiments of the disclosure provide an encoder, which may include a processor and a storage medium storing an instruction executable for the processor.

The storage medium may execute an operation dependently on the processor through a communication bus. When the instruction is executed by the processor, the method for determining a prediction as described in the first aspect is executed.

According to a fourth aspect, the embodiments of the disclosure provide a computer storage medium, which may store an executable instruction. When the executable instruction is executed by one or more processors, the processor executes the method for determining a prediction as described in the first aspect.

The embodiments of the disclosure provide a method for determining a prediction, an encoder and a computer storage medium. The method is applied to the encoder. The method includes the following operations. The reconstructed blocks of the block to be encoded are acquired, and the number of the reconstructed blocks is more than one. The template pixel matrices of the reconstructed blocks are processed according to the preset processing parameters to obtain the processed template pixel matrices. The matched block of the block to be encoded is determined according to the template pixel matrix of the block to be encoded and the processed template pixel matrices. The pixel matrix of the matched block of the block to be encoded is determined as the prediction of the block to be encoded. That is, in the embodiments of the disclosure, through processing of the template pixel matrices of the reconstructed blocks, the matched block of the block to be encoded is determined according to the template pixel matrix of the block to be encoded and the processed template pixel matrices, and further the prediction of the block to be encoded is determined. As such, the templates of the blocks may be processed to obtain more templates, and the more templates may be used to perform matching of the template of the block to be encoded to find the block most matched with the block to be encoded, so as to facilitate to determine the block most matched with the block to be encoded more accurately and further determine the prediction of the block to be encoded. By using a template-based calculation manner, the calculation amount for coding may be reduced, thereby improving the coding efficiency.

DETAILED DESCRIPTION

In order to make the characteristics and technical contents of the embodiments of the disclosure understood in more detail, implementation of the embodiments of the disclosure will be described below in combination with the drawings in detail. The appended drawings are only adopted for description as references and not intended to limit the embodiments of the disclosure.

Figure 1:
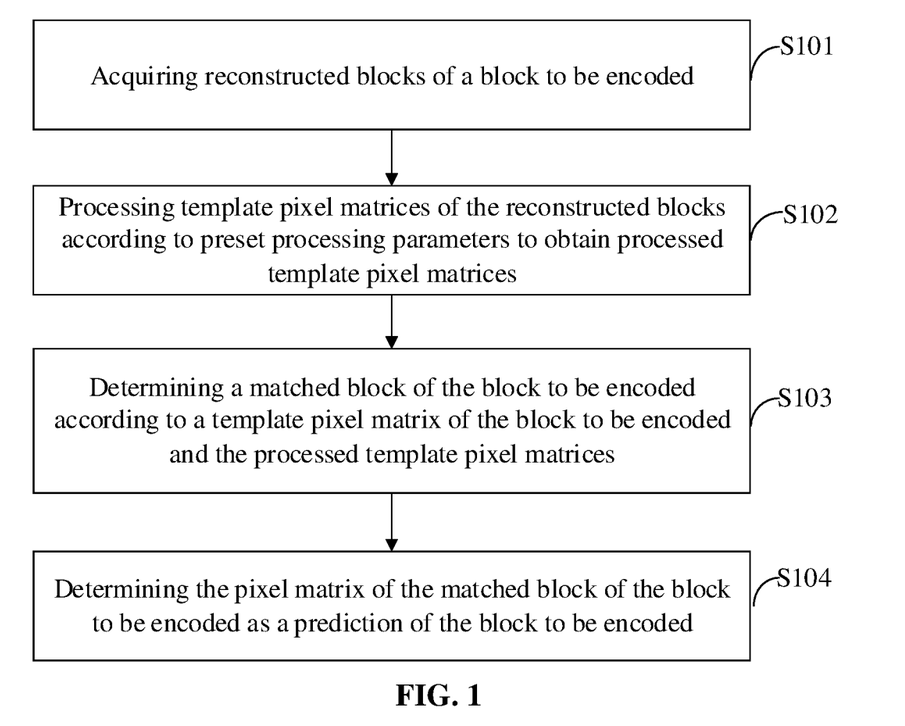
FIG. 1 is a flowchart of an optional method for determining a prediction according to an embodiment of the disclosure.

The embodiments of the disclosure provide a method for determining a prediction. The method is applied to an encoder. FIG. 1 is a flowchart of an optional method for determining a prediction according to an embodiment of the disclosure. Referring to FIG. 1, the method for determining a prediction may include the following operations.

In S101, reconstructed blocks of a block to be encoded are acquired.

Figure 2:
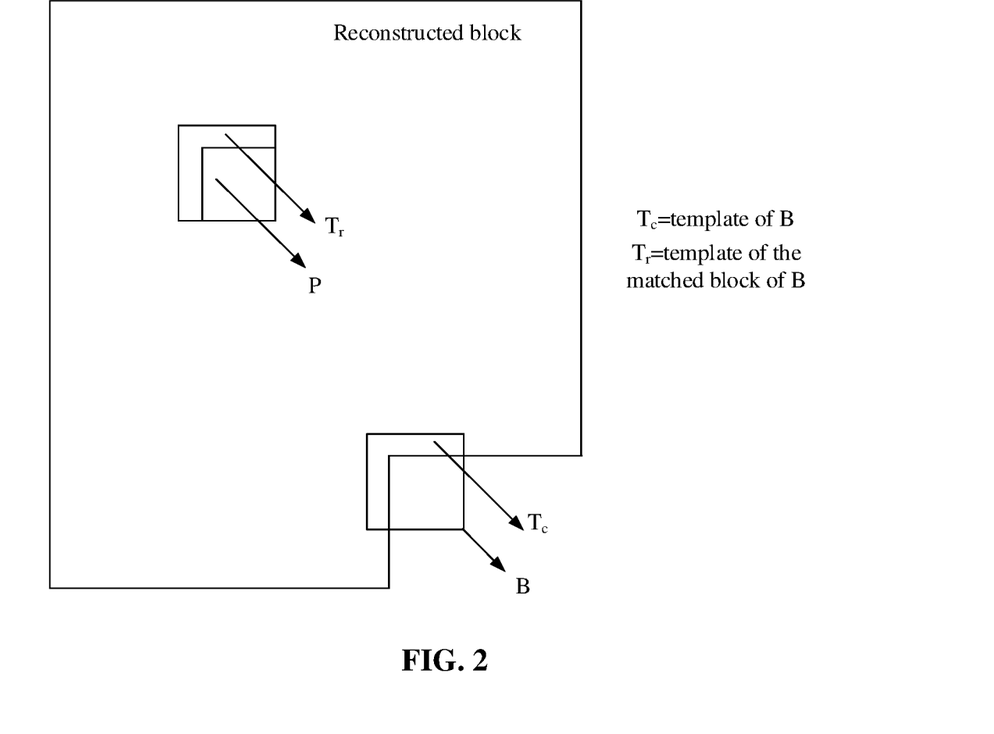
FIG. 2 is a schematic arrangement diagram of a picture frame in intra block template-based matching.

An intra block template-based matching technology is used for intra prediction. FIG. 2 is a schematic arrangement diagram of a picture frame in intra block template-based matching. As illustrated in FIG. 2, for a block to be encoded B, $T_c$ is a template of B. When B is encoded, a template of each reconstructed block in the reconstructed blocks is traversed, a square sum of differences between pixel values at corresponding positions in the template of each reconstructed block and the template of B is calculated, the template $T_r$ corresponding to a minimum value in the square sum of the differences is referred to as a template of the matched block of B, and the pixel value of the reconstructed block P corresponding to $T_r$ is determined as a prediction of B.

Figure 3:
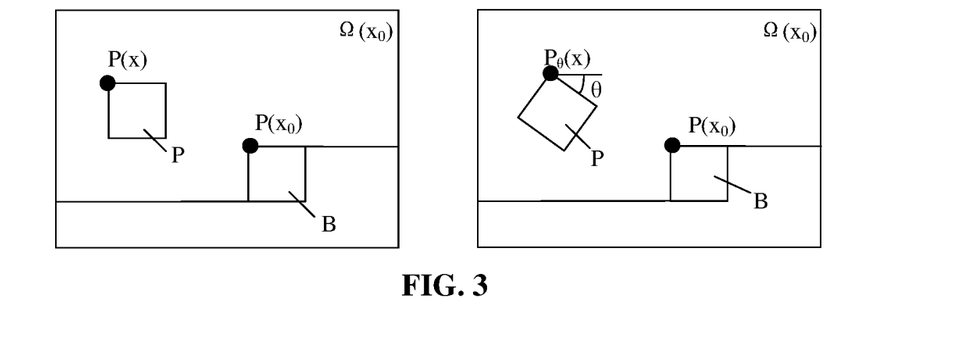
FIG. 3 is a schematic arrangement diagram of a picture frame in rotation intra block copy.

In the abovementioned method, the templates of the reconstructed blocks are taken into account, but the number of the reconstructed blocks is relatively small, so it is difficult to find a matched block of the block to be encoded. For overcoming the shortcoming, a rotation intra block copy technology is used. FIG. 3 is a schematic arrangement diagram of a picture frame in rotation intra block copy. As illustrated in FIG. 3, FIG. 3-(a) is a schematic arrangement diagram of a reconstructed block and a block to be encoded before rotation, and FIG. 3-(b) is a schematic arrangement diagram of the reconstructed block and the block to be encoded after rotation. In FIG. 3-(a) and FIG. 3-(b), B is the block to be encoded, and a vertex coordinate of B is $x_0$. If P is the finally determined matched block of the block to be encoded, and a vertex coordinate of P is x, a pixel matrix of B is recorded as $P(x_0)$. The encoder predicts $P(x_0)$ using a coded pixel matrix $\Omega(x_0)$ (equivalent to a pixel matrix of the reconstructed block). The intra block copy technology is to search for a reconstructed block of which a vertex is x from $\Omega(x_0)$ to minimize a square sum of differences between pixel values of each pixel in $P(x)$ and $P(x_0)$, thereby finding P.

The rotation intra copy technology allows rotation of a block by any angle θ. A pixel matrix of a block obtained by rotating the block of which the vertex is x by θ is represented as $P_\theta(x)$. $\Omega(x_0)$ is searched for the block of which the vertex is x to minimize a square sum of differences between pixel values of each pixel in $P_\theta(x)$ and $P(x_0)$, and $P_\theta(x)$ is determined as the prediction of B.

However, the rotation intra copy technology involves calculations for the whole block, and has high calculation complexity and low coding and decoding efficiency. For improving the video coding and decoding efficiency, the embodiments of the disclosure provide an intra prediction method. First, the block to be encoded is acquired, and the blocks that have been reconstructed during encoding of the block to be encoded are acquired, namely the reconstructed blocks of the block to be encoded are acquired. The number of the reconstructed blocks is more than one.

In S102, template pixel matrices of the reconstructed blocks are processed according to preset processing parameters to obtain processed template pixel matrices.

For finding the block most matched with the block to be encoded, a template pixel matrix of the reconstructed block may be processed using the processing parameter to obtain the processed template. When there are multiple processing parameters, multiple processed templates may be obtained. As such, multiple templates may be obtained for matching with a template of the block to be encoded.

The processing parameter may be a rotation angle, for example, a clockwise rotation angle or a counterclockwise rotation angle. No specific limits are made in the embodiment of the disclosure.

In addition, the processing parameter may also be a movement parameter. The movement parameter may include a movement distance and a movement direction. The template of the reconstructed block is moved according to the movement distance and the movement direction to obtain the processed template, and then the processed template pixel matrix is obtained. For example, the reconstructed block is translated upwards or translated downwards. No specific limits are made in the embodiment of the disclosure.

For obtaining the processed template pixel matrix, in an optional embodiment, when the processing parameter is the rotation angle, the operation in S102 may correspondingly include the following actions.

A template of a reconstructed block is rotated about a vertex of the reconstructed block according to a preset rotation angle, and a rotated template of the reconstructed block is determined as the processed template.

A processed template pixel matrix is calculated using a preset interpolation algorithm according to the preset rotation angle and the template pixel matrix of the reconstructed block.

The preset interpolation algorithm may include a linear interpolation algorithm, a bilinear interpolation algorithm, and a trilinear interpolation algorithm. No specific limits are made in the embodiment of the disclosure.

For example, the processing parameter is a clockwise rotation angle. In practical applications, after the reconstructed block of the block to be encoded is acquired, the template of the reconstructed block may be known, and the template of the reconstructed block is rotated according to the preset rotation angle. Compared with rotating the block, rotating the template may reduce the calculation amount for pixel values of pixels in the rotated template because the number of the pixels in the template is less than the number of pixels in the block.

Figure 4:
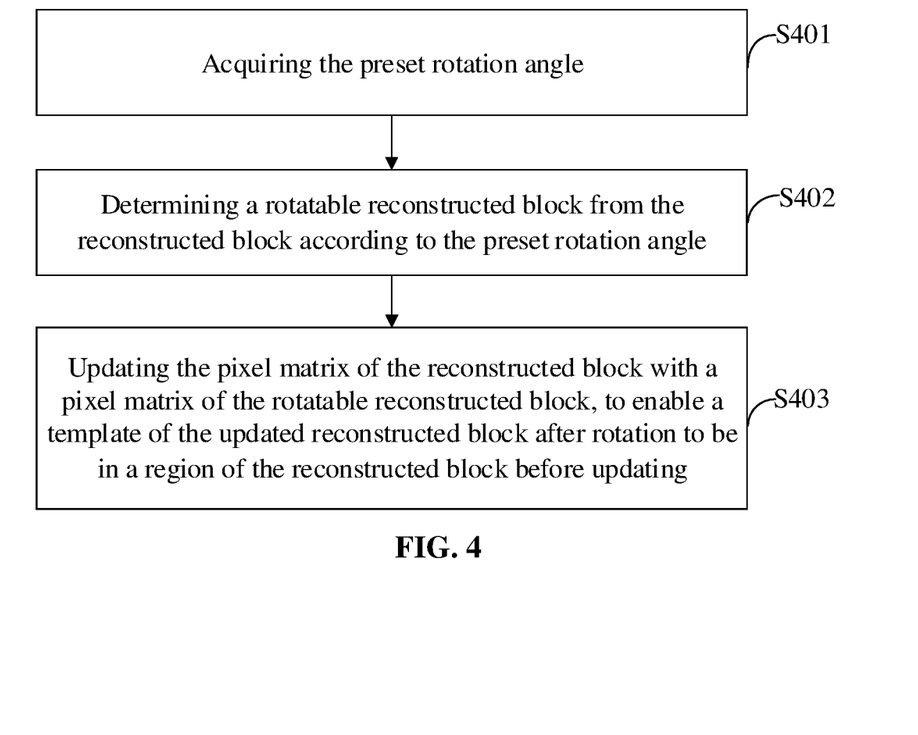
FIG. 4 is a flowchart of another optional method for determining a prediction according to an embodiment of the disclosure.

For ensuring that the rotated template of the reconstructed block is still in a region of the reconstructed block, in an optional embodiment, FIG. 4 is a flowchart of another optional method for determining a prediction according to an embodiment of the disclosure. As illustrated in FIG. 4, before the operation that the processed template pixel matrix is obtained using the preset interpolation algorithm according to the preset rotation angle and the template pixel matrix of the reconstructed block, the method may further include the following operations.

In S401, the preset rotation angle is acquired.

In S402, a rotatable reconstructed block is determined from the reconstructed block according to the preset rotation angle.

In S403, the pixel matrix of the reconstructed block is updated with a pixel matrix of the rotatable reconstructed block, to enable a template of the updated reconstructed block after rotation to be in a region of the reconstructed block before updating.

Specifically, firstly, the preset rotation angle is acquired, the template of the reconstructed block is rotated around a vertex of the template of the reconstructed block according to the preset rotation angle, a reconstructed block beyond the region of the reconstructed block is extracted from the rotated reconstructed block, the remaining reconstructed block is determined as the rotatable reconstructed block, and the pixel matrix of the rotatable reconstructed block is obtained. Then, the pixel matrix of the reconstructed block is updated with the pixel matrix of the rotatable reconstructed block.

Figure 5:
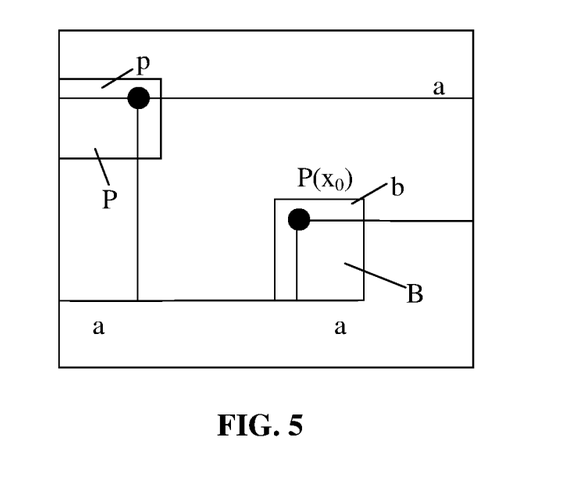
FIG. 5 is a schematic arrangement diagram of an optional rotated intra template according to an embodiment of the disclosure.

FIG. 5 is a schematic arrangement diagram of an optional rotated intra template according to an embodiment of the disclosure. As illustrated in FIG. 5, B is the block to be encoded, b is the template of B, and the pixel matrix of the block corresponding to the vertex coordinate $x_0$ of B is $P(x_0)$. For example, for the reconstructed block P in FIG. 5, after rotation, the rotated reconstructed block P and template p of P are just not beyond the region of the reconstructed block, and an upper row and left row of P may be beyond the region of the reconstructed block if rotated. Therefore, a reconstructed block region with a height a is extracted downwards from an upper boundary of the reconstructed block, a reconstructed block region with the height a is extracted rightwards from a left boundary, and the remaining region after extraction is determined as a rotatable reconstructed block, and the reconstructed block is updated with the rotatable reconstructed block.

In S102, the template of the reconstructed block is rotated according to the preset rotation angle. The preset rotation angle may be any angle preset by a user, such as 30 degrees, 40 degrees, and 60 degrees, or may be a rotation angle set according to a certain preset rule. No specific limits are made in the embodiment of the disclosure.

The preset rotation angle is a rotation angle that takes a preset initial angle as an initial value and takes a preset interval angle as a step length.

In addition, the preset rotation angle is less than 360 degrees.

For example, when the initial value is 30 degrees and the step length is 30 degrees, the preset rotation angle may include 30 degrees, 60 degrees, 90 degrees, 120 degrees, 150 degrees, 180 degrees, 210 degrees, 240 degrees, 270 degrees, 300 degrees, and 330 degrees.

After the preset rotation angle is obtained, the pixel matrix of the rotated template may be determined according to the template pixel matrix of the reconstructed block and the preset rotation angle. Specifically, the pixel matrix of the rotated template of the reconstructed block may be calculated using the preset interpolation algorithm according to pixel values of individual pixels in the template of the reconstructed block, the preset rotation angle and a distance between two adjacent pixels.

Figure 6:
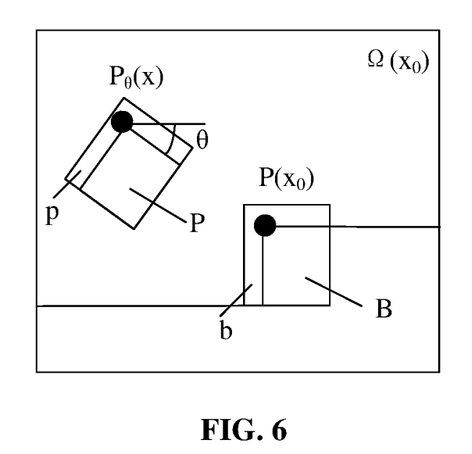
FIG. 6 is a schematic arrangement diagram of another optional rotated intra template according to an embodiment of the disclosure.

For example, FIG. 6 is a schematic arrangement diagram of another optional rotated intra template according to an embodiment of the disclosure. As illustrated in FIG. 6, B is the block to be encoded, the vertex coordinate of B is $x_0$. If P is the matched block of the block to be encoded and the vertex coordinate of P is x, the pixel matrix of B is recorded as $P(x_0)$. The encoder predicts $P(x_0)$ using the coded pixel matrix $\Omega(x_0)$. Before prediction, the template p of P is rotated about the vertex of P according to the preset rotation angle θ to obtain the rotated template p of P as illustrated in FIG. 6. In order to find the template of the reconstructed matched block of the template of the block of which the vertex is x from $\Omega(x_0)$, i.e., p in FIG. 6, P may be found by minimizing a square sum of differences between pixel values of individual pixels in p(x) and $b(x_0)$.

Figure 7:
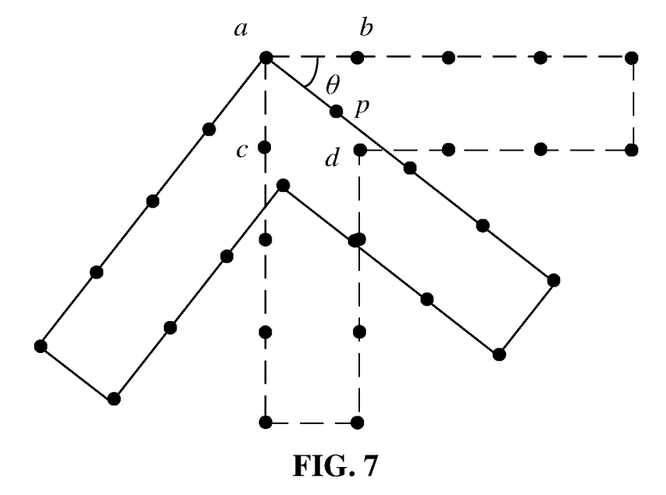
FIG. 7 is a structure diagram of pixels of an optional rotated intra template according to an embodiment of the disclosure.
Figure 8:
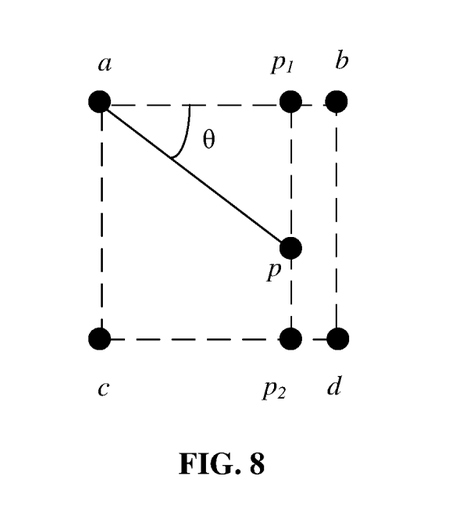
FIG. 8 is a structure diagram of part of pixels of the rotated intra template in FIG. 7 according to an embodiment of the disclosure.

Before the square sum of the differences between the pixel values of individual pixels in p(x) and $b(x_0)$ is calculated, p(x) is required to be determined firstly. In order to determine p(x), FIG. 7 is a structure diagram of pixels of an optional rotated intra template according to an embodiment of the disclosure. As illustrated in FIG. 7, the dotted line is the template p before rotation, and the solid line is the template p after rotation. A pixel value f(a) of pixel a, a pixel value f(b) of pixel b, a pixel value f(c) of pixel c, and a pixel value f(d) of pixel d are acquired from the template p before rotation, and distances x between two adjacent pixel values are acquired. A pixel value of pixel p (pixel b after rotation) is calculated using the bilinear interpolation algorithm. FIG. 8 is a structure diagram of part of pixels of the rotated intra template in FIG. 7 according to an embodiment of the disclosure. As illustrated in FIG. 8, the pixel value of pixel p is calculated through the following formulas.

A pixel value of pixel $p_1$ (illustrated in FIG. 8) is calculated through the following formula:

$$f(p_1) = \frac{x - x \cdot \cos\theta}{x} \cdot f(c) + \frac{x \cdot \cos\theta}{x} \cdot f(b). \quad (1)$$

A pixel value of pixel $p_2$ (illustrated in FIG. 8) is calculated through the following formula:

$$f(p_2) = \frac{x - x \cdot \cos\theta}{x} \cdot f(a) + \frac{x \cdot \cos\theta}{x} \cdot f(d). \quad (2)$$

Finally, the pixel value of pixel p is calculated through the following formula:

$$f(p) = \frac{x \cdot \sin\theta}{x} \cdot f(p_1) + \frac{x - x \cdot \sin\theta}{x} \cdot f(p_2). \quad (3)$$

The same operations may be executed to finally obtain the processed template pixel matrix when the rotation angle is θ.

In S103, a matched block of the block to be encoded is determined according to a template pixel matrix of the block to be encoded and the processed template pixel matrices.

For determining the matched block of the block to be encoded, the template pixel matrix of the block to be encoded and the processed template pixel matrices may be calculated to obtain degree values representing differences between the two, and the reconstructed block to which the template corresponding to a minimum degree value belongs is determined as the matched block of the block to be encoded.

Figure 9:
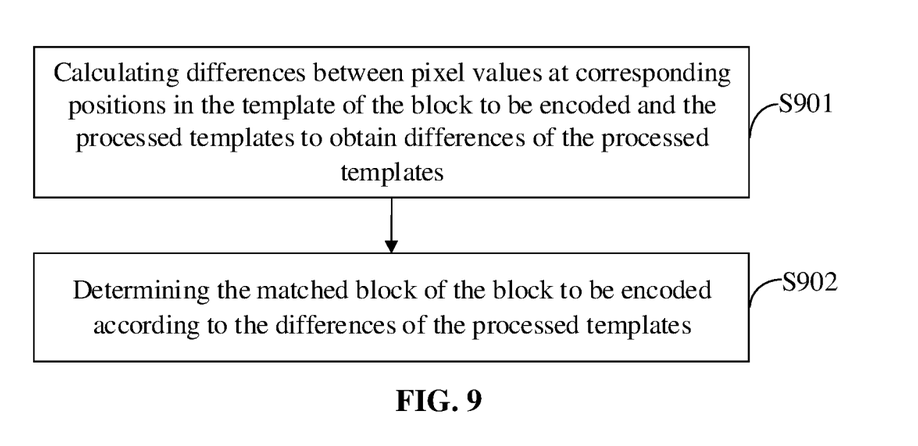
FIG. 9 is a flowchart of another optional method for determining a prediction according to an embodiment of the disclosure.

Specifically, for obtaining the block having a minimum difference with, namely most close to, the block to be encoded from the processed template pixel matrices, in an optional embodiment, FIG. 9 is a flowchart of another optional method for determining a prediction according to an embodiment of the disclosure. As illustrated in FIG. 9, the operation in S103 may include the following actions.

In S901, differences between pixel values at corresponding positions in the template of the block to be encoded and the processed templates are calculated to obtain differences of the processed templates.

In S902, the matched block of the block to be encoded is determined according to the differences of the processed templates.

Specifically, pixel values in the template of the block to be encoded and the processed template are in one-to-one correspondence in position, so the difference between the pixel values at corresponding positions in the template of the block to be encoded and the processed template may be calculated firstly. For each reconstructed block, there is a group of corresponding differences under each rotation angle, and the number of rotation angles corresponds to the group number of differences of the processed templates, so that multiple groups of differences of the processed templates may be obtained. Finally, the matched block of the block to be encoded is determined based on each group of differences of the processed templates.

The more processed templates facilitate to determine the matched block of the block to be encoded.

For determining the matched block of the block to be encoded, in an optional embodiment, the operation in S902 may include the following actions.

Square sums of the differences of the processed templates are calculated to obtain square sums of the processed templates.

A minimum value is selected from the square sums of the processed templates, and the reconstructed block to which the template corresponding to the minimum value belongs is determined from reconstructed block regions.

The reconstructed block to which the template corresponding to the minimum value belongs is determined as the matched block of the block to be encoded.

That is, squares of the differences of the processed template are calculated at first, and then the squares are summed to obtain the square sum of the processed template. The square sum may represent a difference between the processed template and the template of the block to be encoded. If the value is greater, it indicates that the difference is greater, and a mismatch degree is higher. If the value is smaller, it indicates that the difference is smaller, and a match degree is higher. Therefore, the minimum value of the square sum of the processed template is enough to indicate that the processed template is most matched with the template of the block to be encoded. Therefore, the minimum value is selected from the square sums of the processed templates, the reconstructed block to which the template corresponding to the minimum value belongs is determined from the reconstructed block regions, and the reconstructed block corresponding to the minimum value is determined as the matched block of the block to be encoded.

In addition, it is to be noted that, when the matched block of the block to be processed is determined, absolute values of the differences of the processed templates may be calculated at first and then summed to obtain a sum of absolute differences of each processed template, a minimum value is selected from the sums of the absolute differences of the processed templates, the reconstructed block to which the template corresponding to the minimum value belongs is determined from the reconstructed block regions, and the reconstructed block to which the template corresponding to the minimum value belongs is determined as the matched block of the block to be encoded. Alternatively, cubes of the differences of the processed templates may be calculated at first and then summed to obtain cube sums of individual processed templates, a minimum value is selected from the cube sums of the processed templates, the reconstructed block to which the template corresponding to the minimum value belongs is determined from the reconstructed block regions, and the reconstructed block to which the template corresponding to the minimum value belongs is determined as the matched block of the block to be encoded. No specific limits are made thereto in the embodiment of the disclosure.

In S104, the pixel matrix of the matched block of the block to be encoded is determined as a prediction of the block to be encoded.

After being determined in the operation S103, the pixel matrix of the matched block of the block to be encoded is determined as the prediction of the block to be encoded, thereby obtaining the prediction of the block to be encoded.

For implementing decoding of a video picture at a decoder, in an optional embodiment, after the operation in S104, the method may further include the following operations.

A prediction residual of the block to be encoded is determined according to the prediction of the block to be encoded and an acquired pixel value corresponding to an original picture.

The prediction residual of the block to be encoded is transmitted to the decoder, such that the decoder determines a prediction of a block to be decoded using the same prediction determination method provided for the encoder in the embodiment of the disclosure, and decodes a real picture according to the prediction residual and the prediction of the block to be decoded, thereby completing decoding of the video picture.

It is to be noted that the pixel matrix provided in the disclosure may be a pixel matrix of chroma values, or a pixel matrix of luma values. No specific limits are made thereto in the embodiment of the disclosure.

The method for determining a prediction as described in one or more above embodiments will be described below with an example.

Figure 10:
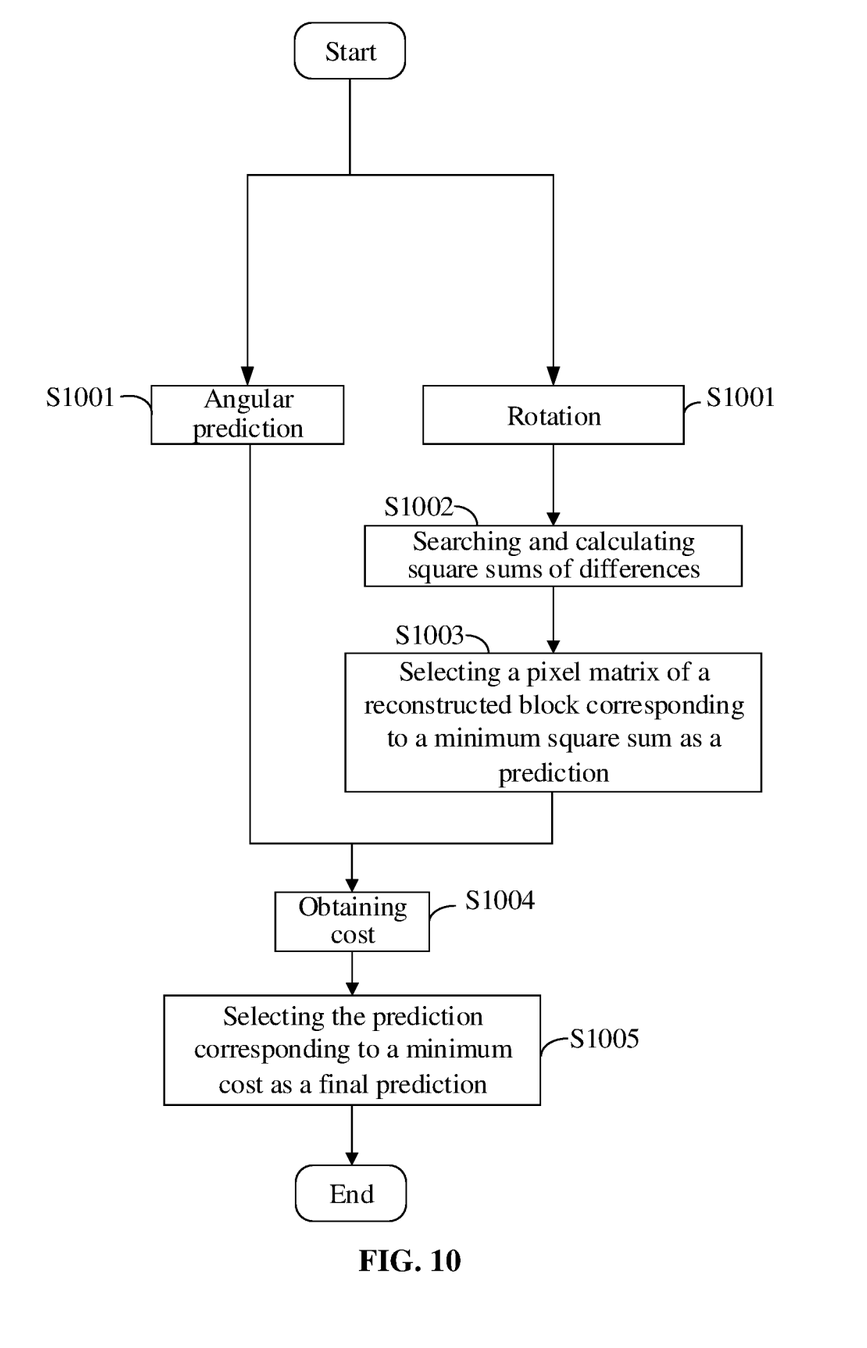
FIG. 10 is a flowchart of an example of an optional method for determining a prediction according to an embodiment of the disclosure.

FIG. 10 is a flowchart of an example of an optional method for determining a prediction according to an embodiment of the disclosure. As illustrated in FIG. 10, the method for determining a prediction may include the following operations.

In S1001, an encoder rotates templates of reconstructed blocks using an intra rotation template matching method. The encoder also uses an angular intra prediction method.

In S1002, after the encoder rotate the templates of the reconstructed blocks, the encoder may traverse all the templates (obtained from the reconstructed blocks) of the reconstructed blocks with the same size as the block to be encoded in a searching range. For each rotated template, the encoder calculates a square sum of differences with a template of the block to be encoded, simultaneously rotates the template according to a rotation angle of which an initial value is 30 degrees, a step length is 30 degrees and an angle value is less than 360 degrees to obtain a rotated template, and calculate a square sum of differences, corresponding to each rotation angle, with the template of the block to be encoded.

In S1003, the encoder selects the template corresponding to a minimum value of the square sum of the difference, and determines a pixel value of the reconstructed block to which the template belongs as a prediction of the block to be encoded.

In S1004, the encoder obtains a prediction residual according to the obtained prediction, and obtains cost1 for use of the intra rotation template matching method according to quantization, variation and entropy coding. The encoder may also obtain cost2 for use of the angular prediction.

In S1005, the encoder compares cost1 with cost2. If cost1 is smaller, the encoder may save prediction information obtained by the rotation template matching, and if cost2 is smaller, the encoder may save prediction information obtained by the conventional angular prediction.

The embodiments of the disclosure provide the method for determining a prediction. The method is applied to an encoder and includes the following operations. The reconstructed blocks of the block to be encoded are acquired, and the number of the reconstructed blocks is more than one. The template pixel matrices of the reconstructed blocks are processed according to the preset processing parameters to obtain the processed template pixel matrices. The matched block of the block to be encoded is determined according to the template pixel matrix of the block to be encoded and the processed template pixel matrices. The pixel matrix of the matched block of the block to be encoded is determined as the prediction of the block to be encoded. That is, in the embodiments of the disclosure, through processing of the template pixel matrices of the reconstructed blocks, the matched block of the block to be encoded is determined according to the template pixel matrix of the block to be encoded and the processed template pixel matrices, and further the prediction of the block to be encoded is determined. As such, the templates of the blocks may be processed to obtain more templates, and the more templates may be used to perform matching of the template of the block to be encoded to find the block most matched with the block to be encoded, so as to facilitate to determine the block most matched with the block to be encoded more accurately and further determine the prediction of the block to be encoded. By using a template-based calculation manner, the calculation amount for coding may be reduced, thereby improving the coding efficiency.

Figure 11:
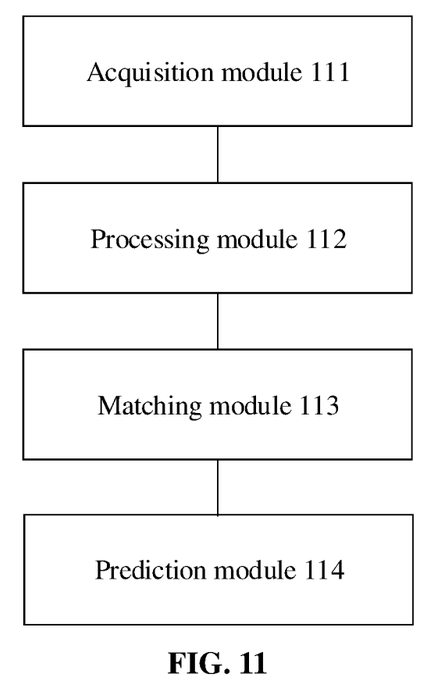
FIG. 11 is a first structure diagram of an encoder according to an embodiment of the disclosure.

Based on the same inventive concept of the abovementioned embodiments, referring to FIG. 11, FIG. 11 is a first structure diagram of an encoder according to an embodiment of the disclosure. The encoder may include an acquisition module 111, a processing module 112, a matching module 113, and a prediction module 114.

The acquisition module 111 is configured to acquire reconstructed blocks of a block to be encoded.

The number of the reconstructed blocks is more than one.

The processing module 112 is configured to process template pixel matrices of the reconstructed blocks according to preset processing parameters to obtain processed template pixel matrices.

The matching module 113 is configured to determine a matched block of the block to be encoded according to a template pixel matrix of the block to be encoded and the processed template pixel matrices.

The prediction module 114 is configured to determine a pixel matrix of the matched block of the block to be encoded as a prediction of the block to be encoded.

In the solution, when the preset processing parameters are rotation angles, the processing module 112 may correspondingly include a rotation submodule and a first determination submodule.

The rotation submodule is configured to rotate a template of a reconstructed block about a vertex of the reconstructed block according to a preset rotation angle, and determine a rotated template of the reconstructed block as the processed template.

The first determination submodule is configured to obtain a processed template pixel matrix using a preset interpolation algorithm according to the preset rotation angle and the template pixel matrix of the reconstructed block.

In the solution, the first determination submodule may include an acquisition submodule, a second determination submodule, and an updating submodule.

The acquisition submodule is configured to acquire, before the processed template pixel matrix of the reconstructed block is obtained using the preset interpolation algorithm according to the preset rotation angle and the template pixel matrix of the reconstructed block, the preset rotation angle.

The second determination submodule is configured to determine a rotatable reconstructed block from the reconstructed block according to the preset rotation angle.

The updating submodule is configured to update the pixel matrix of the reconstructed block with a pixel matrix of the rotatable reconstructed block, to enable a template of the updated reconstructed block after rotation to be in a region of the reconstructed block before updating.

In the solution, the preset rotation angle is a rotation angle that takes a preset initial angle as an initial value and takes a preset interval angle as a step length.

In the solution, the preset rotation angle is less than 360 degrees.

In the solution, the matching module 113 may include a difference calculation submodule and a matching submodule.

The difference calculation submodule is configured to calculate differences between pixel values at corresponding positions in the template of the block to be encoded and the processed templates to obtain differences of the processed templates.

The matching submodule is configured to determine the matched block of the block to be encoded according to the differences of the processed templates.

In the solution, the matching submodule is specifically configured to:

calculate square sums of the differences of the processed templates to obtain square sums of the processed templates;

select a minimum value from the square sums of the processed templates, and determine the reconstructed block to which the template corresponding to the minimum value belongs from reconstructed block regions; and determine the reconstructed block to which the template corresponding to the minimum value belongs as the matched block of the block to be encoded.

It is to be understood that, in the embodiment, "unit" may be part of a circuit, part of a processor, part of a program or software and the like, of course, may also be modular and may also be non-modular.

In addition, each unit in the embodiment may be integrated into a processing unit, each unit may also exist independently, and two or more than two units may also be integrated into a unit. The integrated unit may be implemented in a hardware form and may also be implemented in form of software function module.

When implemented in form of software function module and sold or used not as an independent product, the integrated unit may be stored in a computer-readable storage medium. Based on such an understanding, the technical solution of the embodiments substantially or parts making contributions to the conventional art or all or part of the technical solution may be embodied in form of software product, and the computer software product is stored in a storage medium, including a plurality of instructions configured to enable a computer device (which may be a personal computer, a server, a network device, etc.) or a processor to execute all or part of the operations of the method in the embodiments. The storage medium includes various media capable of storing program codes such as a U disk, a mobile hard disk, a Read Only Memory (ROM), a Random Access Memory (RAM), a magnetic disk, an optical disk or the like.

Figure 12:
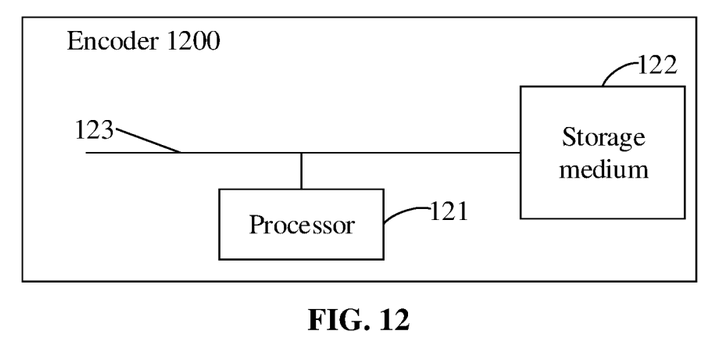
FIG. 12 is a second structure diagram of an encoder according to an embodiment of the disclosure.

FIG. 12 is a second structure diagram of an encoder according to an embodiment of the disclosure. As illustrated in FIG. 12, the embodiment of the disclosure provides an encoder 1200.

The encoder includes a processor 121 and a storage medium 122 storing an instruction executable for the processor 121. The storage medium 122 executes an operation dependently on the processor 121 through a communication bus 123. When the instruction is executed by the processor 121, the method for determining a prediction in embodiment 1 is executed.

It is to be noted that, in practical applications, components in the terminal are coupled together through the communication bus 123. It can be understood that the communication bus 123 is configured to implement connection communication between these components. The communication bus 123 includes a data bus, and further includes a power bus, a control bus, and a state signal bus. However, for clear description, various buses in FIG. 12 are marked as the communication bus 123.

The embodiments of the disclosure provide a computer storage medium, which stores an executable instruction. The executable instruction is executed by one or more processors to enable the processor to execute the method for determining a prediction as described in one or more abovementioned embodiments.

It can be understood that the memory in the embodiment of the disclosure may be a volatile memory or a nonvolatile memory, or may include both the volatile and nonvolatile memories. The nonvolatile memory may be a ROM, a Programmable ROM (PROM), an Erasable PROM (EPROM), an Electrically EPROM (EEPROM), or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DRRAM). It is to be noted that the memory of a system and method described in the disclosure is intended to include, but not limited to, memories of these and any other proper types.

The processor may be an integrated circuit chip with a signal processing capability. In an implementation process, each operation of the method may be completed by an integrated logic circuit in a hardware form in the processor or an instruction in a software form. The processor may be a universal processor, a Digital Signal Processor (DSP), an Application Specific Integrated Circuit (ASIC), a Field Programmable Gate Array (FPGA) or another Programmable Logic Device (PLD), a discrete gate or transistor logic device, and a discrete hardware component. Each method, operation and logical block diagram disclosed in the embodiments of the disclosure may be implemented or executed. The universal processor may be a microprocessor or the processor may also be any conventional processor, etc. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a RAM, a flash memory, a ROM, a PROM or EEPROM, and a register. The storage medium is located in a memory, and the processor reads information in the memory and completes the operations of the method in combination with hardware.

It can be understood that these embodiments described herein may be implemented by hardware, software, firmware, middleware, a microcode or a combination thereof. In case of implementation with the hardware, the processing unit may be implemented in one or more ASICs, DSPs, DSP Devices (DSPDs), PLDs, FPGAs, universal processors, controllers, microcontrollers, microprocessors, other electronic units configured to execute the functions in the disclosure or combinations thereof.

In case of implementation with the software, the technology of the disclosure may be implemented through the modules (for example, processes and functions) executing the functions in the disclosure. A software code may be stored in the memory and executed by the processor. The memory may be implemented in the processor or outside the processor.

It is to be noted that terms "include" and "contain" or any other variant thereof are intended to cover nonexclusive inclusions herein, so that a process, method, object or device including a series of elements not only includes these elements but also includes other elements which are not clearly listed or further includes elements intrinsic to the process, the method, the object or the device. Under the condition of no more limitations, an element defined by the statement "including a/an" does not exclude existence of the same other elements in a process, method, object or device including the element.

The sequence numbers of the embodiments of the disclosure are adopted not to represent superiority-inferiority of the embodiments but only for description.

From the above descriptions about the implementation modes, those skilled in the art may clearly know that the method of the abovementioned embodiments may be implemented in a manner of combining software and a necessary universal hardware platform, and of course, may also be implemented through hardware, but the former is a preferred implementation mode in many circumstances. Based on such an understanding, the technical solutions of the disclosure substantially or parts making contributions to the conventional art may be embodied in form of software product, and the computer software product is stored in a storage medium (for example, a ROM/RAM, a magnetic disk and an optical disk), including a plurality of instructions configured to enable a computer (which may be a personal computer, a server, a network device, etc.) to execute the method in each embodiment of the disclosure.

The embodiments of the disclosure are described above in combination with the drawings, but the disclosure is not limited to the abovementioned specific implementation modes. The abovementioned specific implementation modes are not restrictive but only schematic, those of ordinary skill in the art may be inspired by the disclosure to implement many forms without departing from the purpose of the disclosure and the scope of protection of the claims, and all these shall fall within the scope of protection of the disclosure.

INDUSTRIAL APPLICABILITY

In the embodiments of the disclosure, the reconstructed blocks of the block to be encoded are acquired at first, the number of the reconstructed blocks being more than one, the template pixel matrices of the reconstructed blocks are processed according to the preset processing parameters to obtain the processed template pixel matrices of the reconstructed blocks, the matched block of the block to be encoded is determined from the reconstructed blocks according to the template pixel matrix of the block to be encoded and the processed template pixel matrices of the reconstructed blocks, and the pixel matrix of the matched block of the block to be encoded is determined as the prediction of the block to be encoded. That is, in the embodiments of the disclosure, through processing of the template pixel matrices of the reconstructed blocks, the matched block of the block to be encoded is determined from the reconstructed blocks according to the template pixel matrix of the block to be encoded and the processed template pixel matrices of the reconstructed blocks, and further the prediction of the block to be encoded is determined. As such, the templates of the blocks may be processed to obtain more templates, and the more templates may be used to perform matching of the template of the block to be encoded to find the block most matched with the block to be encoded, so as to facilitate to determine the block most matched with the block to be encoded more accurately and further determine the prediction of the block to be encoded. By using a template-based calculation manner, the calculation amount for coding may be reduced, thereby improving the coding efficiency.

The invention claimed is:

1. A method for determining a prediction, applied to an encoder and comprising:
    acquiring reconstructed blocks of a block to be encoded, a number of the reconstructed blocks being more than one;
    processing template pixel matrices of the reconstructed blocks according to preset processing parameters to obtain processed template pixel matrices, the preset processing parameters comprising a rotation angle or a movement parameter;
    determining a matched block of the block to be encoded according to the processed template pixel matrices; and
    determining a pixel matrix of the matched block of the block to be encoded as a prediction of the block to be encoded.

2. The method of claim 1, wherein determining the matched block of the block to be encoded according to the processed template pixel matrices comprises:
    calculating differences between pixel values at corresponding positions in the processed templates to obtain differences of the processed templates; and
    determining the matched block of the block to be encoded according to the differences of the processed templates.

3. The method of claim 2, wherein determining the matched block of the block to be encoded according to the differences of the processed templates comprises:
    calculating square sums of the differences of the processed templates to obtain square sums of the processed templates;
    selecting a minimum value from the square sums of the processed templates, and determining a reconstructed block to which the template corresponding to the minimum value belongs from reconstructed image block regions; and
    determining the reconstructed block to which the template corresponding to the minimum value belongs as the matched block of the block to be encoded.

4. A method for determining a prediction, applied to a decoder and comprising:
    acquiring reconstructed blocks, a number of the reconstructed blocks being more than one;
    processing template pixel matrices of the reconstructed blocks according to preset processing parameters to obtain processed template pixel matrices, the preset processing parameters comprising a rotation angle or a movement parameter;
    determining a matched block of a block to be decoded according to the processed template pixel matrices; and
    determining a pixel matrix of the matched block of the block to be decoded as a prediction of the block to be decoded.

5. The method of claim 4, wherein determining the matched block of the block to be decoded according to the processed template pixel matrices comprises:
    calculating differences between pixel values at corresponding positions in the processed templates to obtain differences of the processed templates; and
    determining the matched block of the block to be decoded according to the differences of the processed templates.

6. The method of claim 5, wherein determining the matched block of the block to be decoded according to the differences of the processed templates comprises:
- calculating square sums of the differences of the processed templates to obtain square sums of the processed templates;
- selecting a minimum value from the square sums of the processed templates, and determining a reconstructed block to which the template corresponding to the minimum value belongs from reconstructed image block regions; and
- determining the reconstructed block to which the template corresponding to the minimum value belongs as the matched block of the block to be decoded.

7. An encoder, comprising:
a processor; and
a non-transitory storage medium storing an instruction executable for the processor;
wherein the processor is configured to:
acquire reconstructed blocks of a block to be encoded, the number of the reconstructed blocks being more than one;
process template pixel matrices of the reconstructed blocks according to preset processing parameters to obtain processed template pixel matrices, the preset processing parameters comprising a rotation angle or a movement parameter;
determine a matched block of the block to be encoded according to the processed template pixel matrices; and
determine a pixel matrix of the matched block of the block to be encoded as a prediction of the block to be encoded.

8. The encoder of claim 7, wherein the processor is configured to:
- calculate differences between pixel values at corresponding positions in the processed templates to obtain differences of the processed templates; and
- determine the matched block of the block to be encoded according to the differences of the processed templates.

9. The encoder of claim 8, wherein the processor is configured to:
- calculate square sums of the differences of the processed templates to obtain square sums of the processed templates;
- select a minimum value from the square sums of the processed templates, and determine a reconstructed block to which the template corresponding to the minimum value belongs from reconstructed block regions; and
- determine the reconstructed block to which the template corresponding to the minimum value belongs as the matched block of the block to be encoded.

10. A decoder, comprising:
a processor; and
a non-transitory storage medium storing an instruction executable for the processor;
wherein the processor is configured to:
acquire reconstructed blocks, the number of the reconstructed blocks being more than one;
process template pixel matrices of the reconstructed blocks according to preset processing parameters to obtain processed template pixel matrices, the preset processing parameters comprising a rotation angle or a movement parameter;
determine a matched block of a block to be decoded according to the processed template pixel matrices; and
determine a pixel matrix of the matched block of the block to be decoded as a prediction of the block to be decoded.

11. The decoder of claim 10, wherein the processor is configured to:
- calculate differences between pixel values at corresponding positions in the processed templates to obtain differences of the processed templates; and
- determine the matched block of the block to be decoded according to the differences of the processed templates.

12. The decoder of claim 11, wherein the processor is configured to:
- calculate square sums of the differences of the processed templates to obtain square sums of the processed templates;
- select a minimum value from the square sums of the processed templates, and determine a reconstructed block to which the template corresponding to the minimum value belongs from reconstructed block regions; and
- determine the reconstructed block to which the template corresponding to the minimum value belongs as the matched block of the block to be decoded.

* * * * *